Patented June 19, 1951

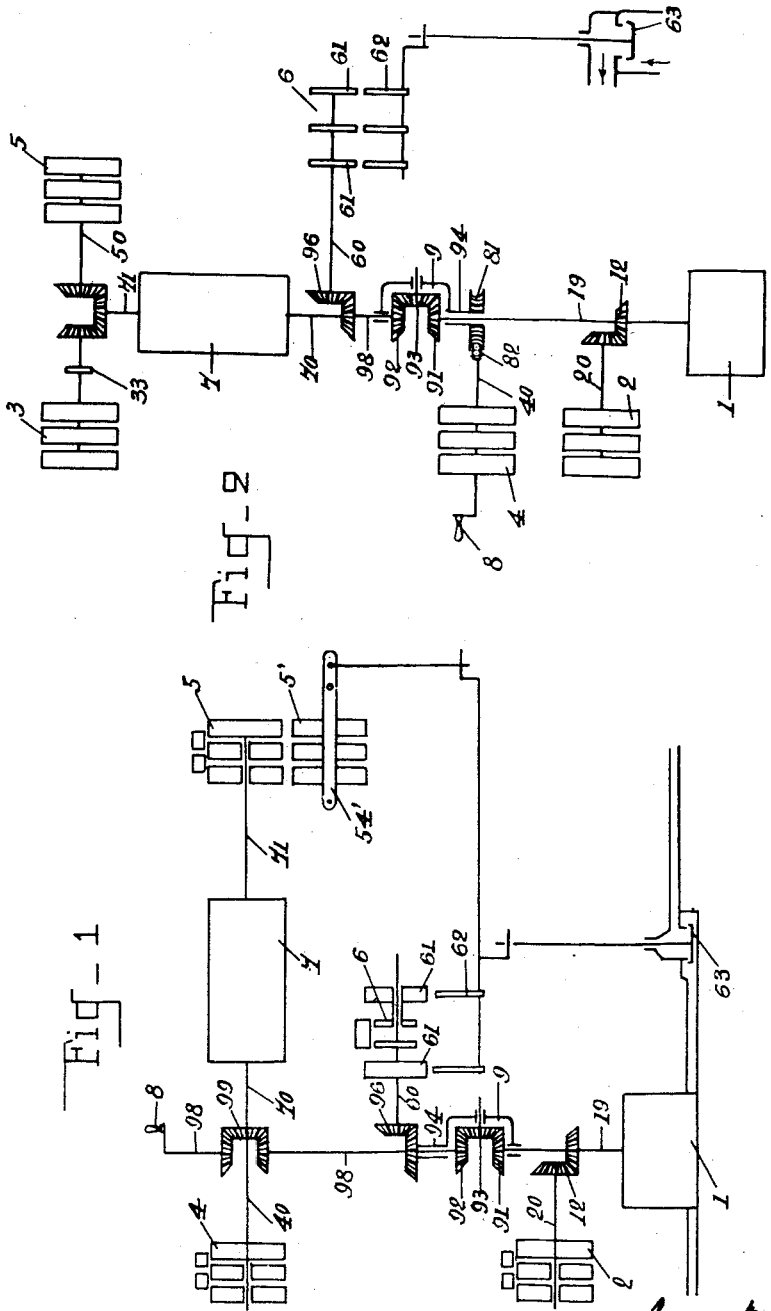

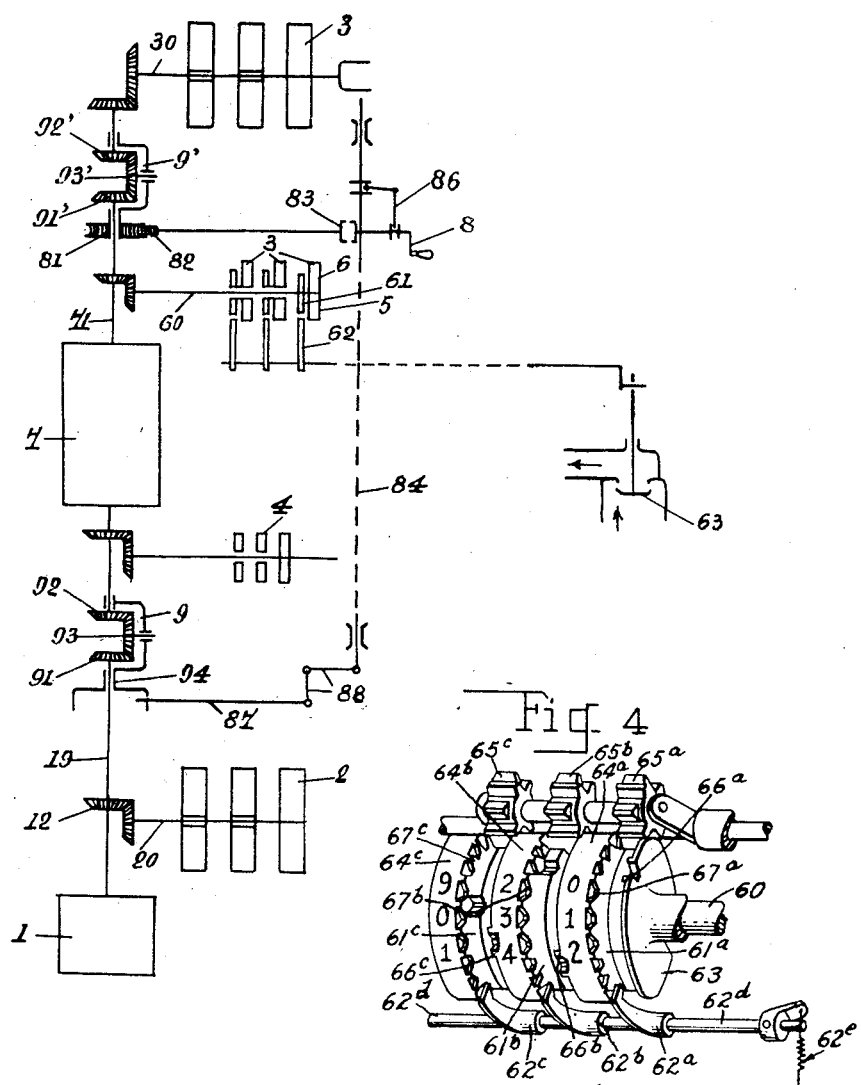

2,557,464

UNITED STATES PATENT OFFICE 2,557,464

PRESETTABLE QUANTITY AND PRICE REGISTER MECHANISM WITH SELECTIVELY ADJUSTABLE UNIT PRICE MEANS

Raymond Lucien Rambert, Gonesse, France, assignor to Satam Societe Anonyme Pour Tous Appareillages Mecaniques, La Courneuve (Department of the Seine), France Application February 25, 1947, Serial No. 730,866
In France August 19, 1941

Section 1, Public Law 690, August 8, 1946
Patent expires August 19, 1961

2 Claims. (Cl. 235—132)

In some liquid measuring and dispensing apparatus, before making any delivery, the amount of units requested by the customer, can be registered by operating through an external control member a volume preindicating register device.

It would often be advantageous to set forth the price corresponding to the number of volume units asked by the customer, particularly in order to enable the operator to prepare his money during the delivery and, eventually to induce the customer to ask an amount of liquid corresponding to given multiples of the price unit in order to avoid the necessity of giving back any small money. It should also be advantageous to enable the customer who wants any liquid or gas for a given sum to be aware in advance of the corresponding volume.

The present invention secures the above advantages and consists in providing in the apparatus itself, in addition to the volume preindicating device, a second mechanism which shows the price, called a price preindicating device, operated by the member which controls the volume preindicating device, the ratio of the transmission connecting the external control member to the price preindicating device being equal to the product of the ratio of the transmission connecting the said member to the volume preindicating device by the price of the volume unit of the liquid or gas to be delivered, so that the reading given by both preindicating devices are to each other as the unit price.

Since the unit volume price of the liquid or gas to be dispensed may vary, it is advantageous to provide an adjustable ratio mechanism in the transmission connecting the external control member to the price preindicating device, said mechanism being called hereafter: variable ratio transmission device.

In some liquid and gas measuring and dispensing apparatus it is known to use an indicating device for the amount of liquid effectively dispensed, hereafter called volume register and an indicating device for the price of the liquid effectively dispensed, hereafter called price register, both register devices being driven by a measuring device for the amount of liquid dispensed by the apparatus, hereafter called volumetric meter. In the said apparatus the registering devices register the amount of liquid or gas in a progressive and continuous way as long as the delivery of liquid or of gas proceeds. The drive of the registering devices by the volumetric meter is generally secured by means of transmissions of which the ratio are to each other as the price of the volume unit of liquid or of a gas dispensed. In most gases, the transmission connecting the volumetric meter to the price register comprises a variable ratio transmission device, the ratio of which is equal to the price of the unit volume of the liquid or gas dispensed.

According to the present invention, it is advantageous to use only one variable ratio transmission device and to insert it in the transmission connecting the external control member to the price preindicating device and in the transmission connecting the volumetric meter to the price register.

In this case it should be advantageous to provide means (autolocks, clutches and the like) for preventing the motion of the external control member being transferred to one or more of the register devices. In the same way means could be provided for preventing the motion of the volumetric meter from causing a displacement of the external control member or of one of the preindicating devices.

Some liquid or gas measuring and dispensing apparatus are provided with a device called below: predetermining device, which is brought by an external control member in a position corresponding to the volume of liquid or of gas to be dispensed and which is brought back into its original position by the volumetric meter, the return in the original position automatically causing the closure of the valve controlling the passage of the liquid through the apparatus and thus stopping the delivery. The said predetermining device is generally integrally formed with a register device in nearly all apparatus. The said predetermining device is operated before the beginning of each dispensing operation.

According to the present invention, the external control member of the predetermining device will be advantageously used for operating the price and volume preindicating devices.

The predetermining device should be operated on the one hand before the delivery (i. e. the volumetric meter being stationary) through the external control member and on the other hand, during the delivery through the volumetric meter itself.

According to the present invention, the connection between the predetermining device on the one hand and the volumetric and external control members on the other hand should be advantageously performed by a mechanical assembly comprising at least a differential gear, the member of the said gear to which is connected the volumetric meter being different from the member or members of the differential gear connected to the external control member and to the predetermining device.

In the case in which the apparatus does not comprise a price register, the drive of the variable ratio transmission device can be from the volumetric meter avoided by arranging the predetermining device and the volumetric meter on the same side of the variable ratio transmission device, the three elements of the above mentioned differential gear being respectively connected to the volumetric meter, to the predetermining device and to the variable ratio transmission device.

More specially, the predetermining device is associated to a repeating device, the readings of which are covered by a shutter, the said shutter being pulled aside when the predetermining device moves back to its original position.

By way of example, the accompanying drawings show some diagrams of mechanisms according to the present invention.

In the drawings 1 is the volumetric meter, 2 the volume register, 3 the price register, 4 the volume preindicating device, 5 the price preindicating device, 6 the predetermining device, for example of the type described in copending application of Carbonaro, Ser. No. 252,491, filed January 23, 1939, now Patent No. 1,773,308, 7 the variable ratio transmission device, 8, for example of the type described in French Patent No. 842,-413, filed February 16, 1938, the external control member and 9 a differential gear providing the connection between the predetermining device 6, the external member 8 and the volumetric meter 1.

In the diagram shown in Figure 1, the volumetric meter 1 operated by the liquid dispensed drives a shaft 19, which carries one of the planet gears 91 of the differential 9. The said shaft 19 drives by means of a set of conical pinions 12 the shaft 20 of the volume register 2. The other planet gear 92 of the differential gear 9 is connected to the external member 8 by a shaft 98 in two parts connected by a set of gears 99. The satellite 93 of the differential 9 is integral with a sleeve 94 which through a set of gears 96 drives the shaft 60 of the predetermining device 6. The predeterminator 6 which is shown on Fig. 4 is a known constructional example formed by three drums 64a, 64b, and 64c, mounted loosely upon the shaft 60 and driven through the intermediary of the satellites 65a, 65b, and 65c by a carrier plate 63 fixed upon the shaft 60. These satellites are driven by tenons 66a, 66b, and 66c, disposed respectively upon the carrier plate 63 and upon the drums 64a and 64b and meshing with the toothed wheels 67a, 67b, and 67c fixed respectively upon the drums 64a, 64b and 64c. Each of the drums has fixed thereto a cam 61a, 61b, and 61c which coact with the teeth 62a, 62b, and 62c of a comb, fixed upon a shaft 62d. A spring 62e tends to constantly apply the teeth 62a, 62b and 62c upon the periphery of the cams 61a, 61b, and 61c, which each have a notch of such kind that when the teeth 62a, 62b, and 62c fall into these notches the drums 64a, 64b, and 64c show the digit zero.

The member 8 drives, through the gear 99 from the one hand the shaft 40 of the volume preindicating device 4 and from the other hand, the shaft 70 of the variable ratio transmission device. The shaft 71 of the variable ratio transmission device drives the price preindicating device 5. The apparatus shown does not comprise any price register.

The apparatus can be used as follows, by way of illustrating example.

The customer asks for 40 liters of liquid the price of which is 3.70 frs. per litre. The member 8 is revolved until the volume preindicating device 4 sets forth 40 litres as requested, the reading of the price preindicating device 5 is then of the amount of 148 frs. (the ratio of the variable ratio transmission device 7 being equal to the unit price i. e. 3.7). The operator suggests to the customer not to supply him with the amount of 40 litres of liquid for 148 frs. but with an amount corresponding to 150 frs., thus avoiding to give him small money. If the customer agrees, the operator will continue to rotate the member 8 until the sum of 150 appears in the price preindicating device 5. The revolution of the member 8 is also transferred by the shafts 98 to the planet gear 92. The other planet gear 91 being locked by the volumetric meter 1 (since the liquid is not yet passing), the motion of the gear 92 is integrally transferred to the satellite 93 and through the latter to the predetermining device 6. It should be noted that the volume register 2 did not yet move and that its reading is zero.

The delivery begins, the valve 63 being open by means not forming part of the invention and therefore not shown, the volumetric meter 1 starts and drives the shaft 19 thus revolving the volume register 2 and the planet gear 91 of the differential gear 9. The planet gear 92 being locked, since the member 8 is also locked at the end of its revolution by a device not shown, the motion of the planet gear 91 is integrally imparted to the satellite 93 and through it to the predetermining device 6. When the latter has again taken its original position, it causes the closure of the valve 63 and the delivery is stopped. At the same time the shutter 54' is drawn back for showing the readings of the repeating device 5', i. e. the price of 150 frs. The customer can thus ascertain that 150 frs. of liquid have been supplied to him and see in the volume register 2 the number of litres, i. e. a little more than 40.5 litres.

When the amount delivered is lower than the amount requested (for instance on account of overflow of the tank to be filled), the price corresponding to the amount delivered can be brought forth in the repeating device 5' by operating the member 8 in the direction reverse to the adjusting manipulation until the predetermining device 6 has been brought back to its original position thus disengaging the shutter 54' (the readings of the price preindicating device 4 and of the volume register 2 will then be registering).

In the diagram of Figure 2 the parts similar to those of Figure 1 bear the same reference numerals.

The operation can be as follows:

The member 8 is revolved thus driving the volume preindicating device, the shaft 40 of the latter is provided with a screw 82 which is meshing with a worm-wheel 81 integral with the sleeve 94, controlling the axis of the satellite 93 of the differential gear 9. The planet gear 91 being locked, since the volumetric meter 1 is stationary, the motion of the satellite 93 is integrally imparted to the planet gear 92 thus driving the shaft 98, 70. The revolution of the said shaft is transferred from the one hand by the pinions 96 to the shaft 60 of the predetermining device 6 and from the other hand to the variable ratio transmission device 7. The shaft 71 of the said device drives from the one hand the shaft 50 of the price preindicating device 5. An autolock 33 carried by the shaft 30 of the price preindicating device 3 transfers the motion of the shaft 71 only in one direction.

When the delivery begins, the volumetric meter 1 drives through the pinions 12 the volume register 2 and the planet gear 91 of the differential gear 9. Since the axis of the satellite 93 cannot revolve owing to the fact that the gear comprising the worm and the wheel 81 is not reversible, the motion of the planet gear 91 is integrally imparted to the planet gear 92 which through the shaft 98, 70 drives from the one hand the predetermining device 6 by means of the pinions 96 and of the shaft 60 and from the other hand the variable ratio transmission device 7 in the reverse direction of the motion of the same during its operation by the member 8. The shaft 71 of the variable ratio transmission device 7 then drives due to the autolock 33 the price register 3.

In the diagram shown in Figure 3, the parts similar to those of Figure 1 bear the same reference numerals.

The member 8 is pushed towards the left, thus securing the engagement of the clutch 83. The revolving motion of the member 8 is imparted, by a non-reversible control 81, 82, similar to the control of Fig. 2, to the satellite 93' of a differential gear 9'. The planet gear 92' being stopped due to the locking of the shaft 30 of the price register 3 by means of a locking rod 84 at the time at which the member 8 is depressed owing to the rod assembly 86, the motion of the satellite 93' is integrally imparted to the planet gear 91' of the differential gear 9' which drives from the one hand the predetermining device 6 also integral with the price preindicating device and from the other hand, the variable ratio transmission device 7. The said device drives from the one hand the volume preindicating device 4 and by means of the differential gear 9 the satellite 93 which rotates against the other planet gear 91 locked by the volumetric meter 1.

When the delivery begins, the member 8 is pushed towards the right, by a spring, not shown, thus unlocking the shaft 30 and locking the satellite 93 of the differential gear 9 by means of the rod 87 connected to the rod 84 by means of a crank lever 88. In its rotation the volumetric meter 1 drives on the one hand the volume register 2 and on the other hand the planet gear 91, the motion of which is integrally imparted to the planet gear 92. The said planet gear drives in its twin the volume preindicating device 4 and the variable ratio transmission device 7. The shaft 71 of the latter brings the predetermining device 6 to its original position and by means of both planet gears 91' and 92', the axis of the satellite 93' being locked due to the non-reversing of the control 81, 82 to the price register. The whole mechanism is stopped when the predetermining device is brought back in its original position, thus stopping the delivery.

I claim:

1. A fluid distributing measuring apparatus comprising a manual control element, a measuring element actuated by the fluid actually dispensed, a predeterminating mechanism, a valve controlling the flow, means controlled by said predeterminating mechanism for controlling said valve, a volume preindicator mechanism, a price preindicator mechanism, a differential mechanism comprising three elements, a first connection connecting said measuring element to one of the elements of said differential mechanism without passing through the intermediary of the other elements of said differential mechanism, a second connection connecting the predeterminating mechanism to another element of said differential mechanism different from that which is connected to the measuring element, without passing through the intermediary of the two other elements of said differential mechanism, a third connection connecting said manual control element, the volume preindicator and the price preindicator to the element of the differential mechanism, not connected to the measuring element and to the predeterminating mechanism without passing through the intermediary of the two elements connected to the measuring element and to the predeterminating mechanism and means for immobilizing the element of the differential mechanism connected to the manual control element during the rotation of the element of the differential mechanism connected to the measuring element.

2. An apparatus as set forth in claim 1 in which the means for mobilizing the element of the differential mechanism connected to the manual control element consists of an arrangement for unidirectional drive.

RAYMOND LUCIEN RAMBERT.

REFERENCES CITED

The following references are of record in the file of this patent:

UNITED STATES PATENTS

| Number | Name | Date |
| --- | --- | --- |
| 2,062,997 | Orbeck | Dec. 1, 1936 |
| 2,145,843 | Maxson | Jan. 31, 1939 |
| 2,180,821 | Ginnel | Nov. 21, 1939 |
| 2,305,221 | Mangan | Dec. 15, 1942 |
| 2,310,347 | Berck | Feb. 9, 1943 |
| 2,358,712 | Hinds | Sept. 19, 1944 |

FOREIGN PATENTS

| Number | Country | Date |
| --- | --- | --- |
| 824,761 | France | Nov. 18, 1937 |
| 369,581 | Italy | Mar. 24, 1939 |
| 100,670 | Sweden | Jan. 14, 1941 |

Certificate of Correction

Patent No. 2,557,464 June 19, 1951

RAYMOND LUCIEN RAMBERT

It is hereby certified that error appears in the printed specification of the above numbered patent requiring correction as follows:

Column 3, line 29, for the patent number "1,773,308" read *2,527,703*;

and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*